(12) United States Patent
Kim (10) Patent No.: US 6,246,570 B1
(45) Date of Patent: Jun. 12, 2001

(54) PORTABLE COMPUTER HAVING A MICROPHONE

(75) Inventor: Sang-Moo Kim, Kyunggi-do (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/329,298

(22) Filed: Jun. 10, 1999

(30) Foreign Application Priority Data

Jun. 10, 1998 (KR) .................................. 98-21468

(51) Int. Cl.[7] .............................. H05K 5/00; H05K 5/02
(52) U.S. Cl. .......................... 361/683; 361/686; 361/680; 361/681; 364/708.1
(58) Field of Search .................................. 361/683, 686, 361/681, 682, 724–727; 381/388, 309, 385–387, 87, 88, 91, 122, 355, 361–363; D14/113, 114, 225, 226, 229; 364/708.1

(56) References Cited

U.S. PATENT DOCUMENTS

| D. 262,535 | * | 1/1982 | Fisher | D14/13 |
|---|---|---|---|---|
| D. 327,480 | * | 6/1992 | Soren | D14/229 |
| D. 334,387 | * | 3/1993 | Bostock et al. | D14/227 |
| D. 349,286 | * | 8/1994 | Robertus | D14/159 |
| D. 371,784 | * | 7/1996 | Gertz | D14/159 |
| D. 397,120 | * | 8/1998 | Liou | D14/229 |
| 2,532,173 | * | 11/1950 | Lewis | 248/161 |
| 5,504,813 | * | 4/1996 | Takasaki | 379/433 |
| 5,604,814 | * | 2/1997 | Chen et al. | 381/169 |
| 5,608,863 | * | 3/1997 | Ishizawa et al. | 395/501 |
| 5,633,942 | * | 5/1997 | Terng | 381/169 |
| 5,748,757 |   | 5/1998 | Kubli et al. . | |
| 5,799,036 | * | 8/1998 | Staples | 375/222 |
| 5,799,096 |   | 8/1998 | Liao . | |
| 5,801,919 | * | 9/1998 | Griencewic | 361/683 |
| 5,805,709 |   | 9/1998 | Liou . | |
| 5,828,768 |   | 10/1998 | Eatwell et al. . | |
| 5,836,304 | * | 11/1998 | Kellinger et al. | 128/630 |
| 5,872,557 |   | 2/1999 | Wiemer et al. . | |
| 5,992,805 | * | 11/1999 | Tanner | 248/161 |
| 5,995,599 | * | 11/1999 | Dunn et al. | 379/93.37 |
| 5,999,822 | * | 12/1999 | Wicks et al. | 455/550 |
| 6,011,686 | * | 1/2000 | Grasso et al. | 361/686 |
| 6,024,337 | * | 2/2000 | Correa | 248/442.2 |

FOREIGN PATENT DOCUMENTS

| 0107592 | * | 10/1983 | (EP) | H05K/7/02 |
|---|---|---|---|---|
| 2205193A | * | 11/1988 | (GB) | G11B/33/02 |
| 10-126470 | * | 5/1998 | (JP) | H04M/1/03 |

* cited by examiner

Primary Examiner—Leo P. Picard
Assistant Examiner—Anatoly Vortman
(74) Attorney, Agent, or Firm—Robert E. Bushnell, Esq.

(57) ABSTRACT

A portable computer comprises a housing, a microphone holder mounted in the housing so as to be inserted into or projected from the housing, a groove formed in the housing to receive the microphone holder, and a microphone mounted on the free end of the microphone holder, wherein the microphone holder is projected from the groove when using the microphone. The microphone may be used with the microphone holder received in the groove. Preferably, the microphone holder may be made of a flexible material. The microphone holder may further comprise a first holder attached to the housing in the groove by a hinge, and a second holder attached to the first holder by a hinge to be folded over the first holder. In this case, the microphone is mounted on the free end of the second holder. Thus, the microphone may be removed to a distance from the portable computer, so that the user adjusts the position of microphone as desired, and in addition, there is prevented the howling or echoing generated between the speaker and microphone.

14 Claims, 7 Drawing Sheets

PORTABLE COMPUTER HAVING A MICROPHONE

CLAIM OF PRIORITY

This application makes reference to, incorporates the same herein, and claims all benefits accruing under 35 U.S.C. §119 from an application for Portable Computer Having a Microphone earlier filed in the Korean Industrial Property Office on Jun. 10, 1998 and there duly assigned Ser. No. 21468/1998.

FIELD OF THE INVENTION

The present invention concerns a portable computer provided with a microphone for inputting external sounds.

BACKGROUND OF THE INVENTION

U.S. Pat. No. 5,828,768 for a Multimedia Personal Computer With Active Noise Reduction And Piezo Speakers to Eatwell et al discloses a plurality of microphones on the lid of a laptop computer. The problem with having the microphones in such a location is that 1) the user is a large distance away from the microphones during use, causing the microphones not to work as well, and 2) the microphones may be in the vicinity of speakers located on the notebook computer allowing for interference between the speakers and the microphone when both are in use.

What is needed is a notebook computer that has a microphone that can be placed near a user. What is also needed is a microphone that is placed far enough away from the speakers so that there is no interference between the microphone and the speakers.

SUMMARY OF THE INVENTION

It is an object of the present invention to provide a portable computer with a speaker and microphone which prevents howling or echoing generating between the two devices.

It is another object of the present invention to provide a portable computer with a speaker and a microphone which includes means for the user to effectively and conveniently use the microphone.

According to an embodiment of the present invention, a portable computer comprises a housing, a microphone holder mounted in the housing so as to be inserted into or projected from the housing, a groove formed in the housing to receive the microphone holder, and a microphone mounted on the free end of the microphone holder, wherein the microphone holder is projected from the groove when using the microphone. The microphone may be used with the microphone holder received in the groove. Preferably, the microphone holder may be made of a flexible material. The microphone holder may further comprise a first holder attached to the housing in the groove by a hinge, and a second holder attached to the first holder by a hinge to be folded over the first holder. In this case, the microphone is mounted on the free end of the second holder. Thus, the microphone may be removed to a distance from the portable computer, so that the user adjusts the position of microphone as desired, and in addition, there is prevented the howling or echoing generated between the speaker and microphone.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
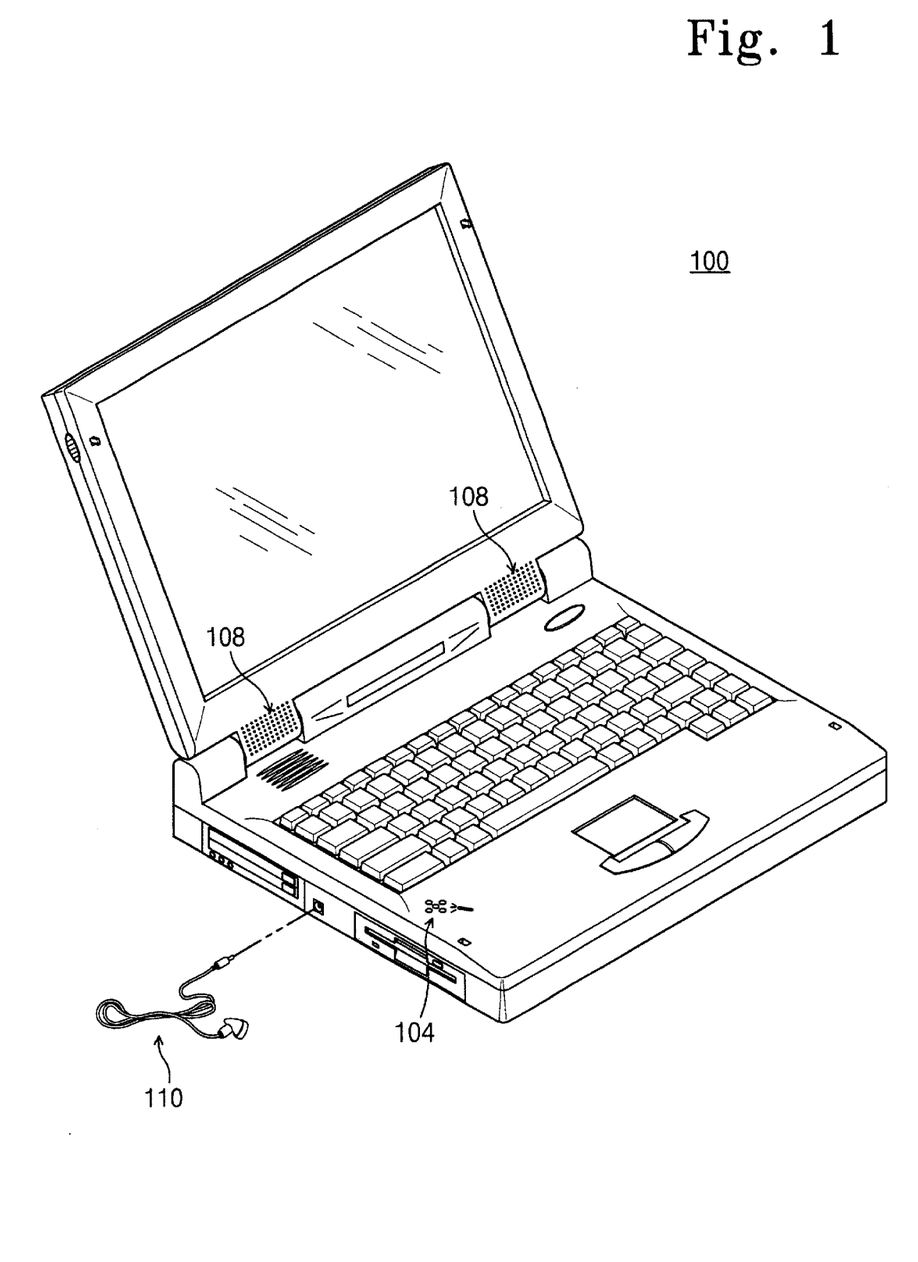
FIG. 1 is a perspective view for illustrating an earlier portable computer.

As shown in FIG. 1, a portable computer 100 such as notebook computer is generally provided with a speaker 108 for producing stored sounds and a microphone 104 for inputting external sounds. In this case, the microphone 104 and speaker 108 may be usually used in two ways. Namely, the microphone 104 and the speaker 108 may be simultaneously or selectively used. For example, when listening to music reproduced from a compact disk through the speaker 108, the microphone 104 is turned off, while both devices are used simultaneously during two-way video communication. When the microphone 104 or speaker 108 is selectively used or turned on, there occurs no problem. However, when both devices are simultaneously used, the sound produced from the speaker may be inputted to the microphone to cause howling or echoing. An echo canceler may be provided to eliminate such phenomenon, but it requires that there must be secured a sufficient distance between the two devices. This requirement is too difficult to meet especially in a small portable computer such as wallet PC, PDA (personal digital assistant) and HPC (hand-held personal computer). On the other hand, an earphone 110 may be used as shown in FIG. 1, but its handling makes the user inconvenient. Meantime, in order for the user to effectively speak to the microphone, the distance between the mouth and microphone must be sufficiently decreased.

Figure 2:
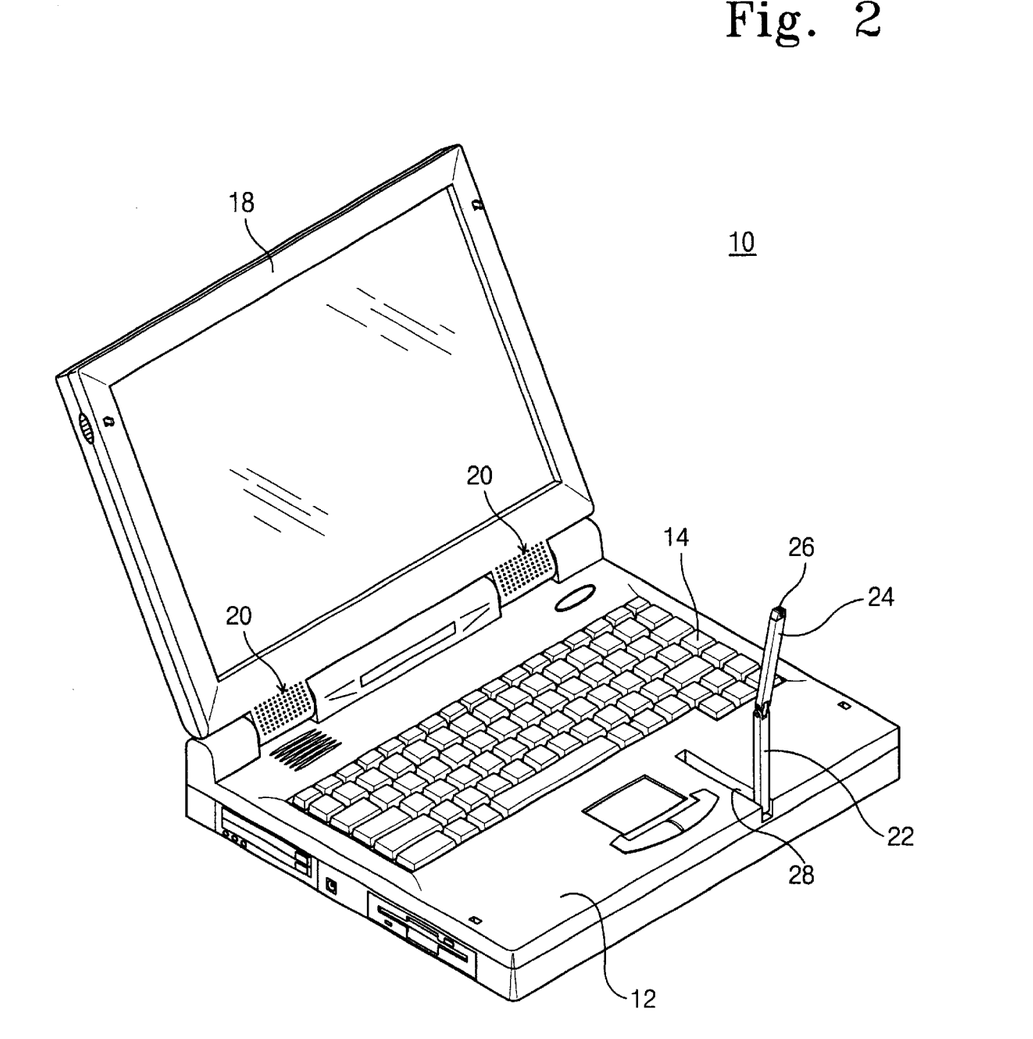
FIG. 2 is a perspective view for illustrating a microphone projected from the housing of a portable computer according to the present invention.
Figure 3:
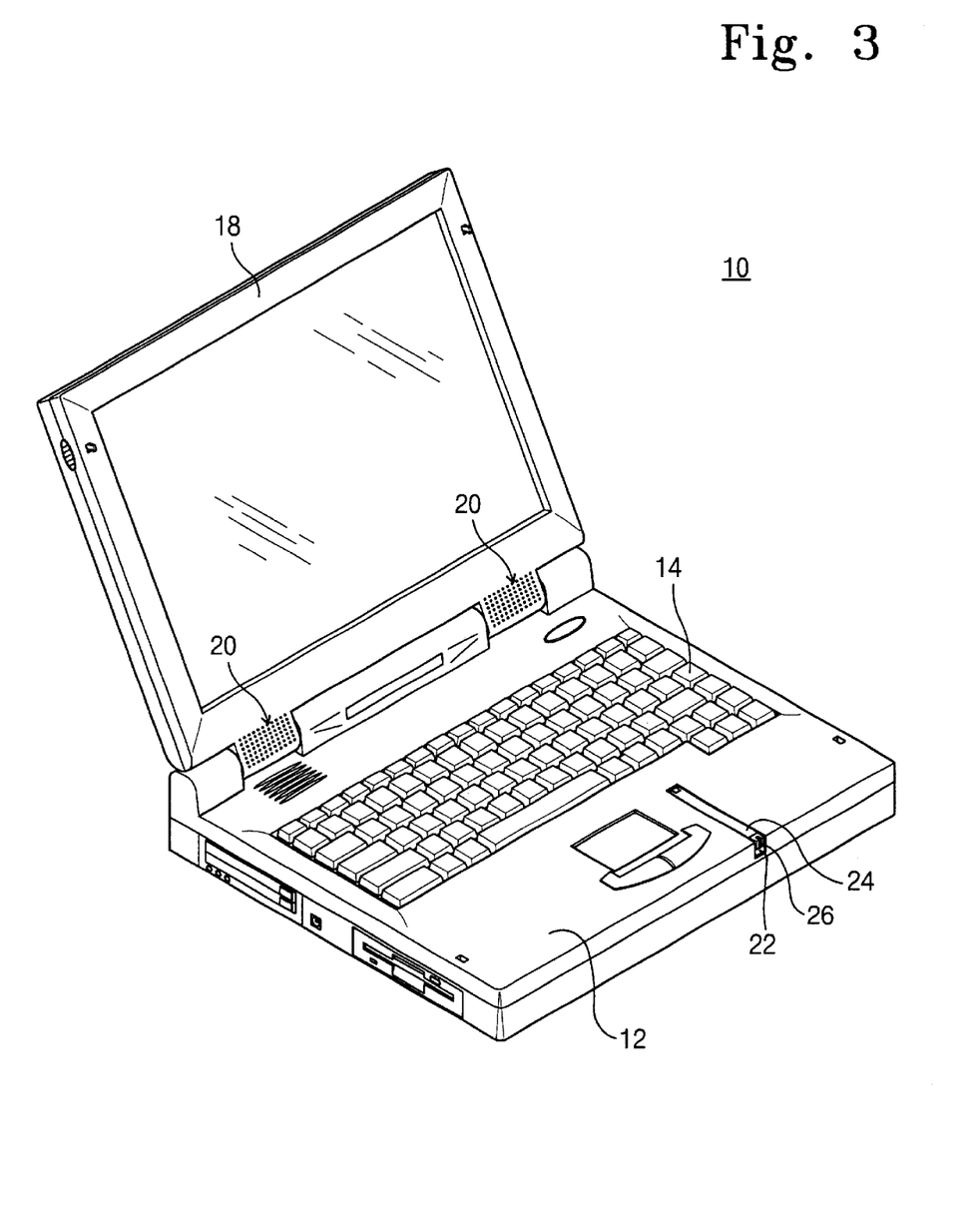
FIG. 3 is a perspective view similar to FIG. 2 but the microphone holder inserted into the housing of a portable computer according to the present invention.

Referring to FIGS. 2 and 3, there is shown a portable computer 10 with a microphone 26 whose position may be adjusted as desired. The portable computer 10 generally comprises a main system body 12 containing electronic circuits and devices and a display panel part 18. The keyboard 14 is mounted on the upper surface of the main system body 12. The display panel part 18 is attached to one side of the main system body 12 by hinge means so as to close or open the upper surface of the main system body 12. Of course, the portable computer may take other structural types. For example, the smaller portable computers such as wallet PC, PDA and HPC have display assemblies integrally formed with the main system bodies.

The housing of the main system body 12 is provided with a groove 28 to receive a microphone holder comprising first and second holders 22 and 24. The first holder 22 is attached into the groove 28 by a hinge. The free end of the first holder 22 is connected with one end of the second holder 24 by a hinge. The microphone 26 is mounted on the free end of the second holder 24. The first and second holders 22 and 24 may be made of a flexible material so as to withstand impact or shock.

In the present embodiment, although being shown as a single piece, the second holder 24 may consist of multiple pieces connected by hinges in order to increase the length of the microphone holder received in the limited space of the groove. In this case, the microphone 26 is mounted on the free end of the last piece. The holders 22 and 24 are preferably designed to have hollow spaces to receive the conductive lines for connecting the microphone 26 with the electronic circuits of the computer. Of course, the holders 22 and 24 are made to keep the position where the microphone is removed.

As shown in FIG. 3, the microphone 26 may be used with the holders 22, 24 received in the groove 28. However, if howling or echoing is generated between the microphone 26 and speaker 20 in that position, the holders 22, 24 may be projected from the groove 28 in order to eliminate such howling or echoing, as shown in FIG. 2. The position of the microphone 26 may be adjusted as desired by handling the holders 22, 24.

Figure 4:
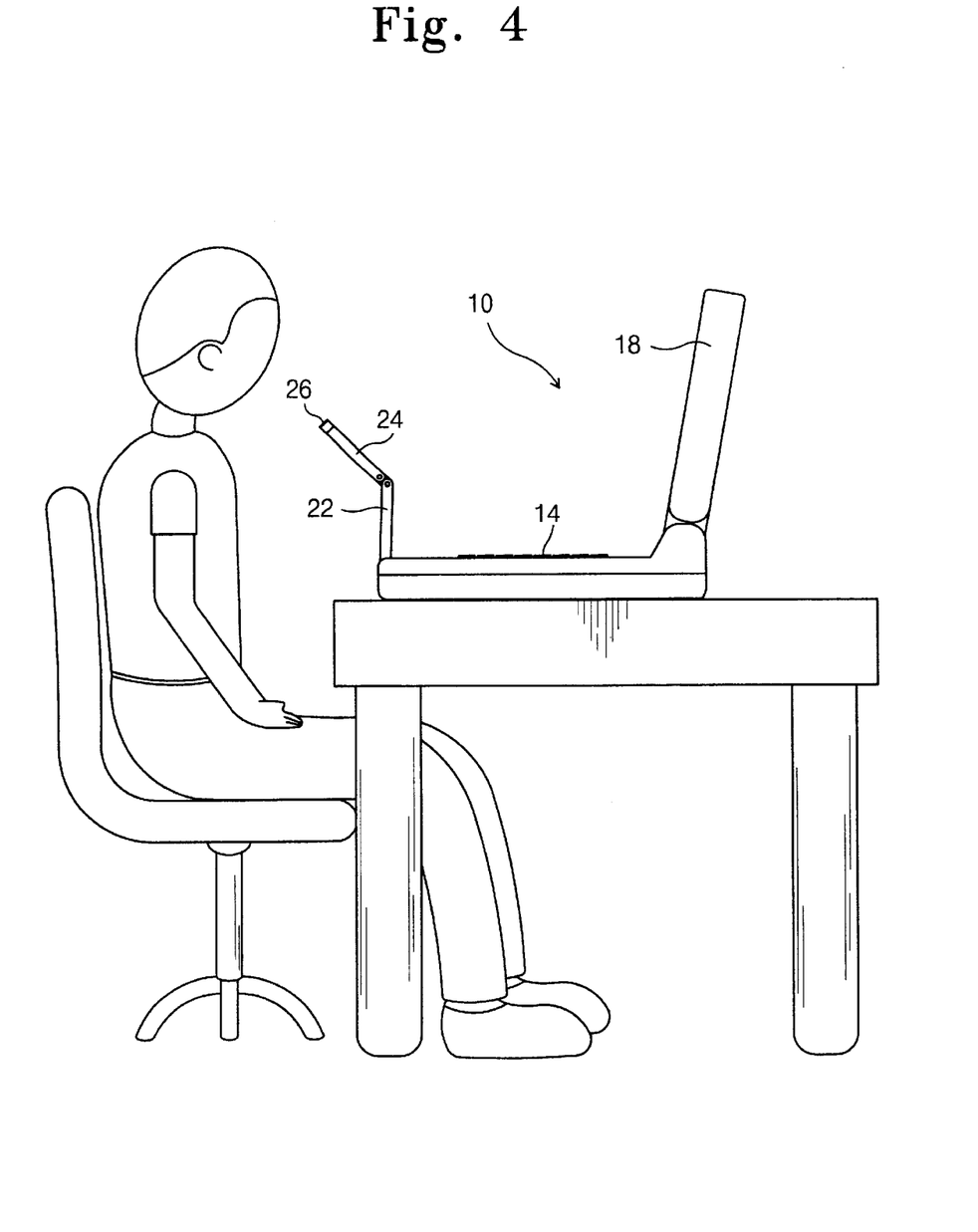
FIG. 4 is a side elevation for illustrating the user operating a portable computer with the microphone holder projected from the housing according to the present invention.

FIG. 4 is a side elevation for illustrating the user operating a portable computer with the microphone holder projected from the housing according to the present invention. As can be seen from FIG. 4, the microphone 26 is much closer to a user's mouth than are the microphones of the earlier art.

Figure 5A:
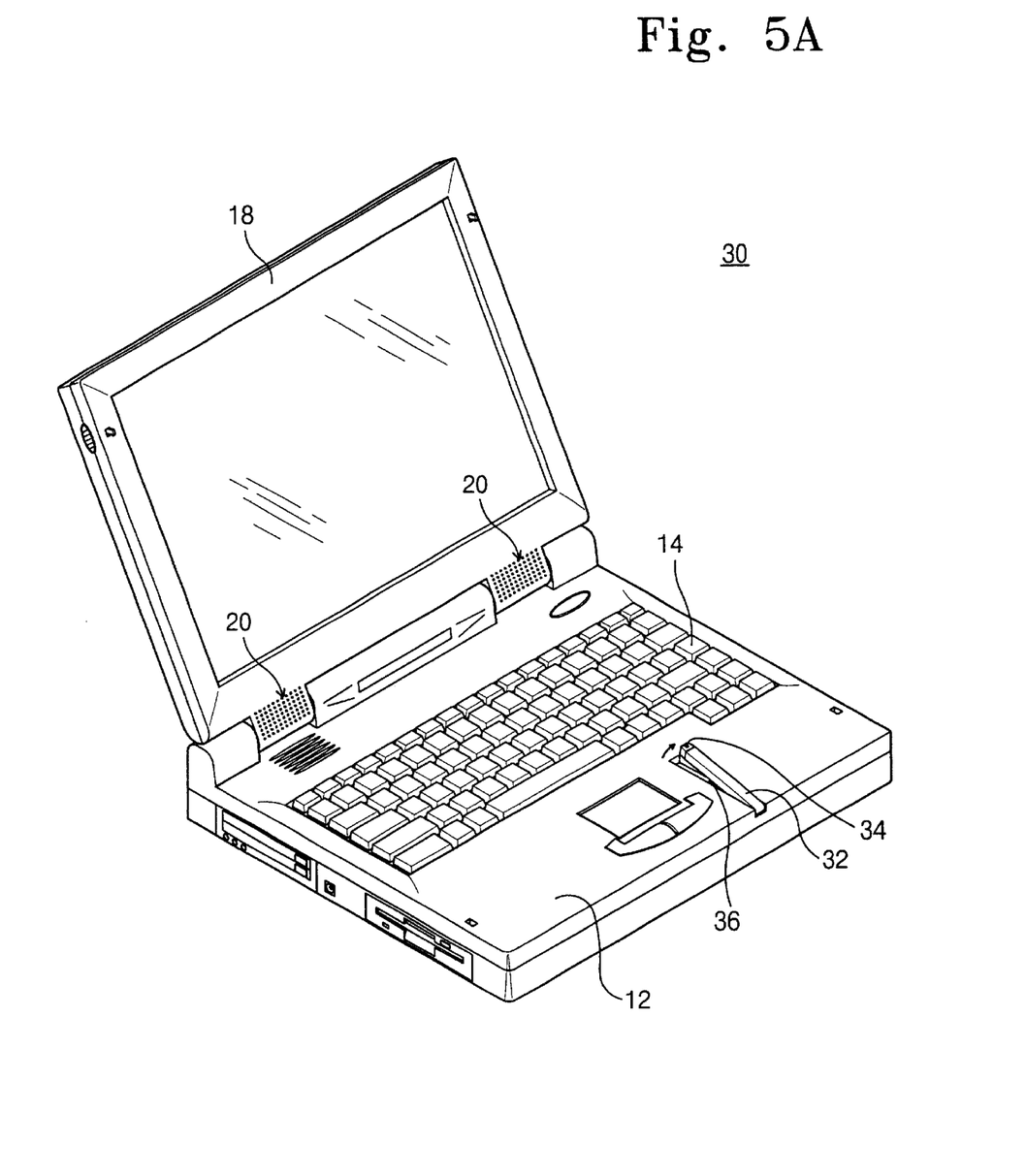
FIGS. 5A to 5C are perspective views for illustrating the use of another embodiment of the microphone holder.
Figure 5B:
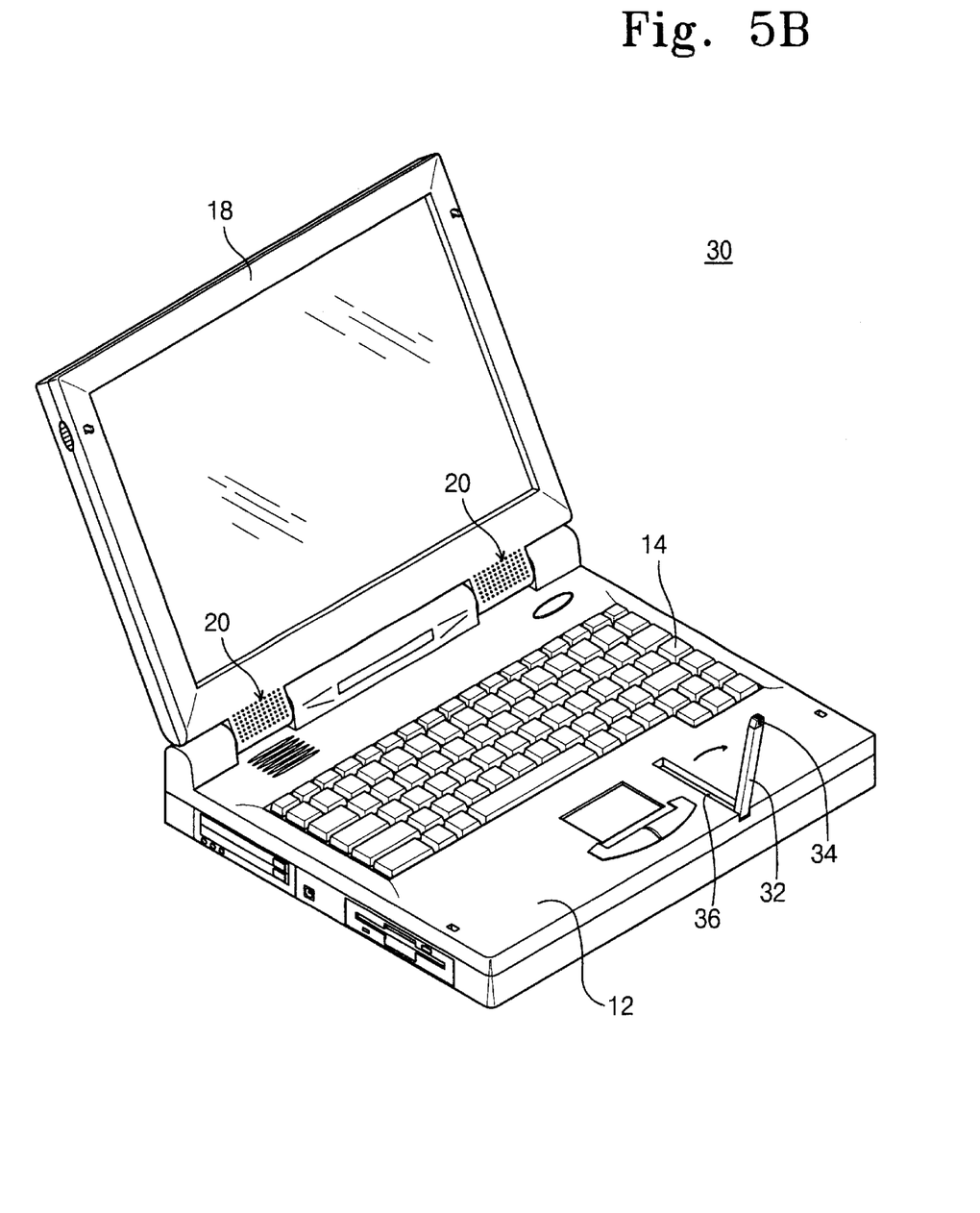
Figure 5C:
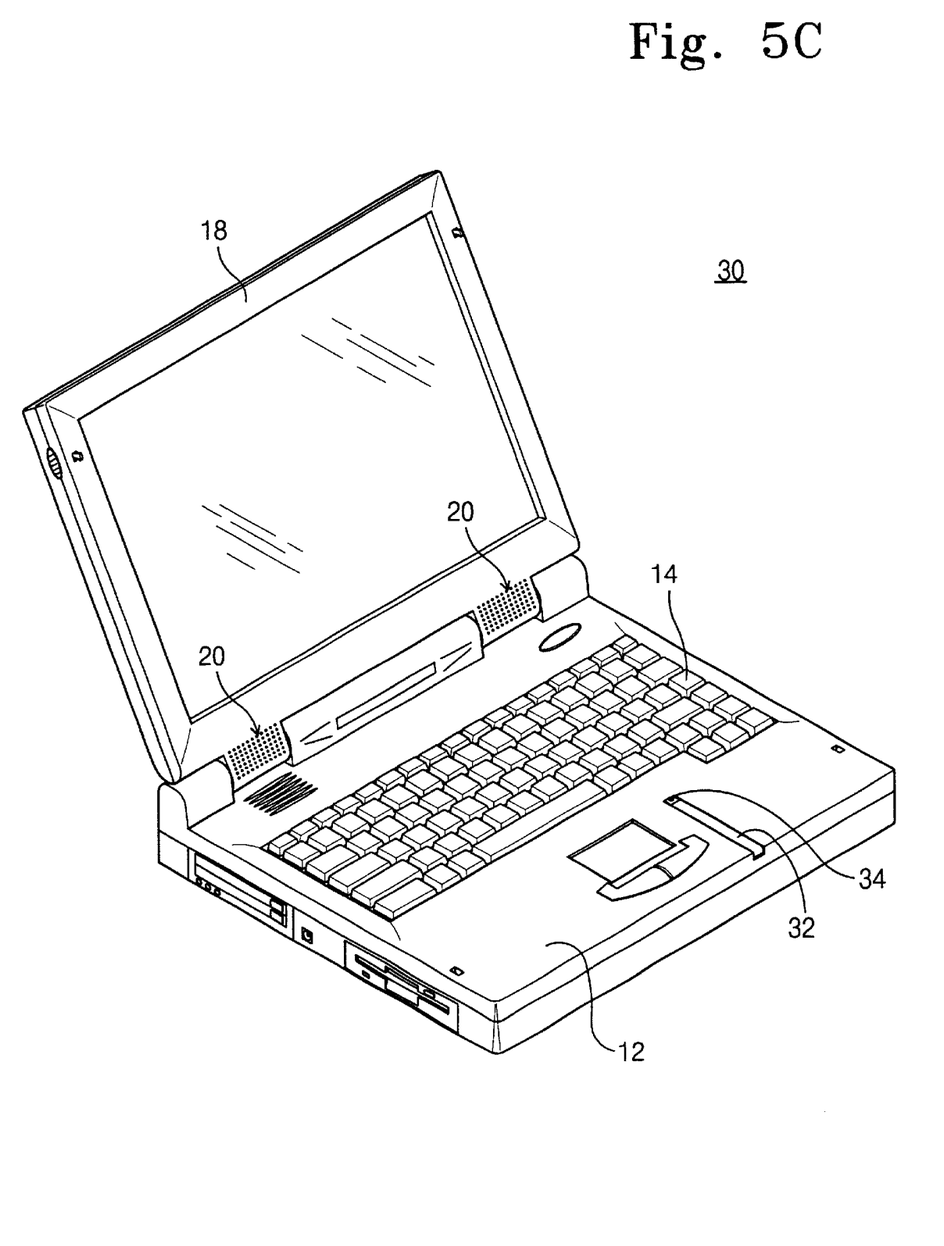

FIGS. 5A to 5C illustrate a portable computer 30 with a microphone holder only consisting of a single holder 32, which may be applied to a palm-sized computer such as wallet PC. The housing of the computer is provided with a small groove 36 to receive the single holder 32.

Thus, the inventive microphone holder provides a portable computer with means for eliminating howling or echoing generated between the speaker and microphone as well as adjusting the position of the microphone as desired. While the present invention has been described in connection with specific embodiments accompanied by the attached drawings, it will be readily appreciated by those skilled in the art that various changes and modifications may be made thereto without departing the gist of the present invention.

What is claimed is:

1. In a portable computer comprising:

a housing;

a microphone holder mounted in said housing of said portable computer so as to be inserted into or projected from said housing, said microphone holder having a proximal end and a distal end;

a groove formed in said housing of said portable computer to receive said microphone holder; and a microphone mounted on said distal end of said microphone holder, wherein said proximal end of said microphone holder is projected from said groove when using said microphone;

the improvement comprising:

a first holder attached to said housing in said groove by a hinge; and a second holder having a proximal end and a distal end, said proximal end attached to said first holder by a hinge adapted to be folded over said first holder, said microphone mounted on said distal end.

2. The portable computer of claim 1, wherein said microphone is adapted for use with said microphone holder folded into said groove.

3. In a portable computer, comprising:

a lid having an LCD display portion thereon; and a base portion hingedly attached to said lid, said base portion comprising:

a keyboard;

a microphone holder having a distal end and a proximal end, said proximal end being mounted on said base portion;

a groove disposed on said base portion for receiving said microphone holder; and a microphone disposed on said proximal end of said microphone holder, wherein said microphone holder can fold into said groove or can be folded to project outward from said base portion of said portable computer;

the improvement comprising; said microphone holder comprising:

a first segment; and a second segment that can either be folded into said groove of said base portion or extend outward from said base portion to accommodate a user, said first segment being connected to said second segment by a hinge, said microphone being disposed on said second segment opposite said hinge, and a portion of said first segment opposite said hinge being connected to said groove on said base portion of said portable computer.

4. A portable computer, comprising:

a cover portion having an LCD display;

a base portion pivotally connected to said cover portion, a top side of said base portion comprising:

speakers mounted near a rear portion of said top side of said base portion of said portable computer;

a collapsible microphone assembly located near a front portion of said top side of said base portion of said portable computer; and a keyboard disposed between said speakers and said collapsible microphone assembly on said top side of said portable computer;

said collapsible microphone assembly being adapted to fold into a groove on said front portion of said top side of said base portion of said portable computer;

the improvement comprising:

said collapsible microphone assembly comprising a microphone holder having a proximal end and a distal end, said proximal end pivotally fixed to said groove in said base portion of said portable computer and said distal end bearing a microphone; and said collapsible microphone assembly adapted to be extended from said groove so that said microphone is located above said top side of said base portion of said portable computer and extends forward from said front portion of said base portion of said portable computer so that said microphone is near a user and away from said speakers.

5. The portable computer of claim 4, wherein said collapsible microphone assembly comprises a first segment and a second segment that can either be folded into said groove of said base portion or extend outward from said base portion to accommodate a user, said first segment being connected to said second segment by a hinge, said microphone being disposed on said second segment opposite said hinge, and a portion of said first segment opposite said hinge being connected to said groove on said base portion of said portable computer.

6. The portable computer of claim 4, wherein said collapsible microphone assembly consists of a single segment that can either be folded into said groove of said base portion or extend outward from said base portion to accommodate a user.

7. A portable computer comprising:

a housing;

a groove formed in said housing;

a microphone holder having two ends inserted into or projected from said groove, said one end of said microphone holder is hingedly connected to said groove at the nearest position to a user; and a microphone mounted on said another end of said microphone holder, wherein said microphone is projected from said groove when using microphone.

8. A portable computer as defined in claim 7, wherein one side part of said microphone is exposed outwardly when said microphone holder is folded into said groove so that said microphone may be used with microphone holder received in said groove.

9. A portable computer comprising:

a housing;

a groove formed in said housing;

a microphone holder having a first end and a second end, said holder inserted into or projected from said groove, said first end of said microphone holder hingedly connected to said groove at the nearest position to a user, said microphone holder comprising a first holder and a second holder that can either be folded into said groove or projected from said groove, said first holder being connected to said second holder by a hinge, said microphone being mounted on said second holder opposite said hinge, and a portion of said first holder opposite said hinge being connected to said groove by another hinge being near a user; and a microphone mounted on said second end of said microphone holder, wherein said microphone is projected from said groove when using microphone.

10. A portable computer, comprising:

a lid having an LCD portion thereon;

a base portion hingedly attached to said lid, said base portion comprising:
 a keyboard;
 a groove formed on an external surface of said base portion, said groove adapted to receive a microphone holder;
 a microphone holder having two ends, said one end being attached hingedly on said groove at the nearest position to a user, said microphone holder comprising a first segment and a second segment that can either be folded into said groove of said base portion or extend outward from said base portion to accommodate a user, said first segment being connected to said second segment by a hinge, said microphone being disposed on said second segment opposite said hinge, and a portion of said first segment opposite said hinge being connected to said groove by another hinge being near a user; and
 a microphone disposed on said another end of said microphone holder, wherein said microphone holder can either fold into said groove or project outward from said groove.

11. The portable computer of claim 10, wherein said microphone holder consists of a single segment that can either be folded into said groove of said base portion or extend outward from said groove to accommodate a user.

12. A portable computer, comprising:

a cover portion having an LCD;

a base portion pivotally connected to said cover portion, a top side of said base portion comprising:
 speakers mounted near a rear portion of said top side of said base portion;
 a collapsible microphone assembly located near a front portion of said top side of said base portion; and
 a keyboard disposed between said speakers and said collapsible microphone on said top side of said base portion, wherein said collapsible microphone assembly can fold into a groove on said front portion of said top side of said base portion of said portable computer.

13. The portable computer of claim 12, wherein said collapsible microphone assembly comprises a microphone holder having two ends, said one end pivotally fixed to said groove in said front side of said base portion and said another end bearing a microphone, wherein said collapsible microphone assembly can be folded into said groove and said collapsible microphone assembly can be extended from said groove so that said microphone is located above said top side of said base portion of said portable computer and extending forward from said front portion of said base portion of said portable computer so that said microphone is near a user and away from said speakers.

14. The portable computer of claim 13, wherein said collapsible microphone assembly consists of a single segment that can either be folded into said groove of said base portion or extend outward from said to accommodate a user.

* * * * *